Aug. 10, 1971     H. S. BLOCH     3,598,873
MEANS FOR PURIFYING LOW MELTING POINT SOLIDS
Filed April 27, 1967
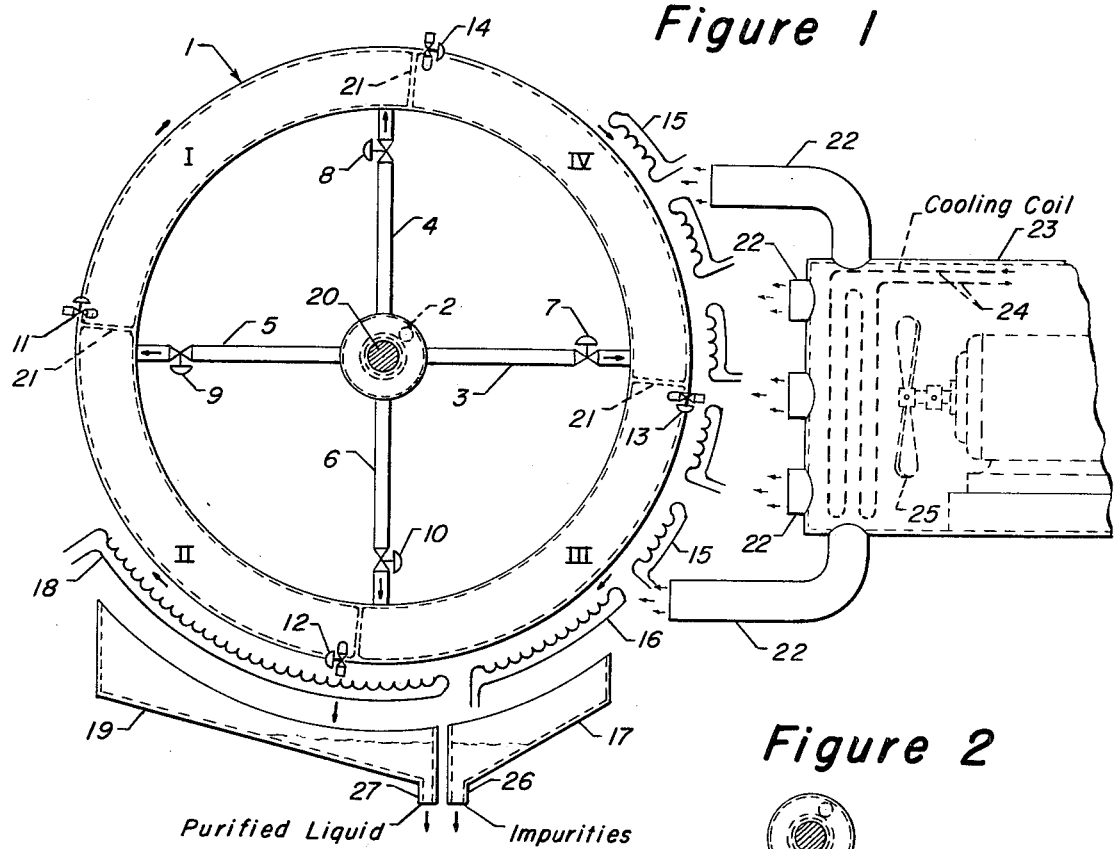
Figure 1
Figure 2
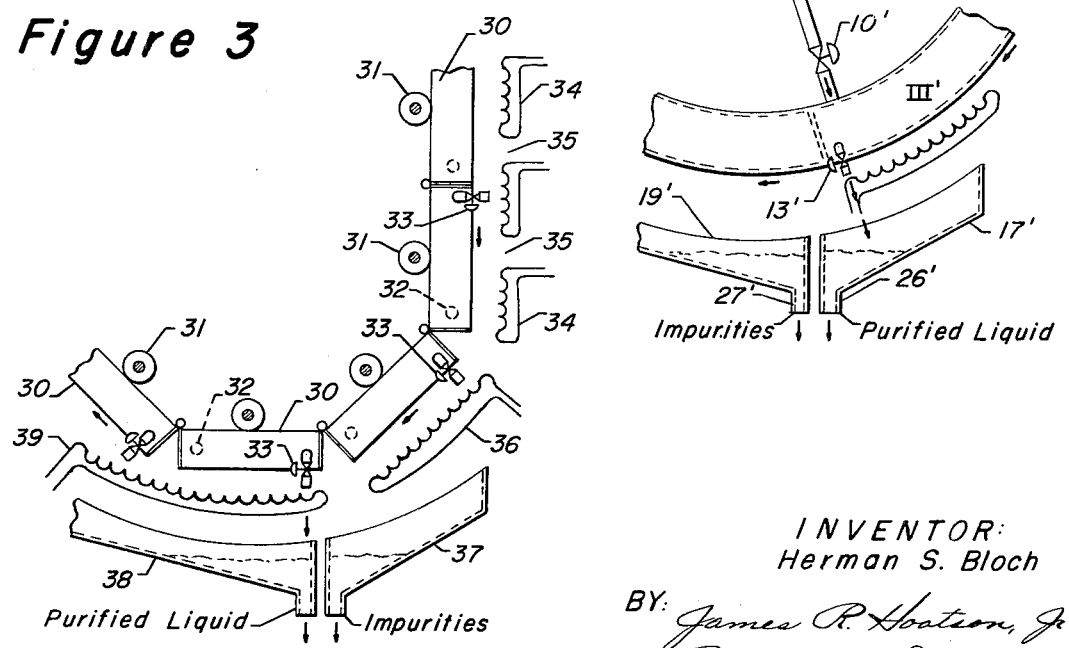
Figure 3
INVENTOR:
Herman S. Bloch
BY: James R. Hooton, Jr.
Philip T. Liggett
ATTORNEYS 3,598,873
MEANS FOR PURIFYING LOW MELTING
POINT SOLIDS
Herman S. Bloch, Skokie, Ill., assignor to Universal
Oil Products Company, Des Plaines, Ill.
Filed Apr. 27, 1967, Ser. No. 634,352
Int. Cl. C07c 39/04
U.S. Cl. 260—621A                     8 Claims

ABSTRACT OF THE DISCLOSURE

A continuous method for purifying low melting point solids by heating the solid material into a molten state and distributing it sequentially into a series of separate elongated moving zones which are externally heated by spaced heater means such that alternate heating and cooling takes place on the molten material. The result is a "molten wave" which, in effect, travels opposite to the direction of movement of the series of moving zones so that withdrawal may be in two stages. In a withdrawal stage for each zone, an impure stream is separately withdrawn and a substantially purified stream separately withdrawn. Each emptied zone moves along to again pass through the entire cyclic operation.

SUMMARY OF THE INVENTION

The present invention relates to an improved continuous method for effecting the purification of low melting solid materials. More specifically, there is provided means for causing the repeated heating and cooling of a low melting point solid material so that any impurities will move to an end portion of each of a plurality of separate zones that are caused to move in a cyclic system, whereby an impure stream and a substantially pure molten stream can be separately withdrawn from the system.

Generally, the removal of an impurity or undesired product carried along with or incorporated in a low melting point material has involved the utilization of various types of batch separation procedures, decanting operations, and the like. Such conventional methods are time consuming and as a result quite uneconomical, particularly as compared with a continuous system. For example, in effecting the production of pure phenol from the crude product stream formed by the hydrolysis of cumene hydroperoxide, there is a particular need to have a continuous purifying system to eliminate the undesired higher melting point materials.

Thus, it may be considered a principal object of the present invention to provide a continuous cyclic system for purifying and collecting a desired low melting point solid material.

A further object of the present invention is to provide a continuous cyclic system for purifying and collecting a desired low melting point solid material through the utilization of a series of separate zones each being subjected to alternate heating and cooling to in turn provide a "molten wave effect within each zone and a movement of the undesired impurities to one end of each zone, whereby an impure stream and a substantially purified molten stream may be sequentially removed from the system.

In a broad aspect, the present invention provides a continuous method for purifying low melting solid materials, in a manner which comprises, heating the material to be purified into a molten state and distributing it sequentially to a plurality of separate elongated zones being successively positioned in a movable series thereof, effecting a continuous movement of said series of separate zones within a cyclic system and following the filling of molten material into each zone in a sequential manner, effecting indirect cooling of said zone and a resulting solidification of the material to be purified therein, effecting indirect heating sufficient to cause melting of such solidified material in such zone, further effecting at least one additional cooling step and at least one additional heating and melting step, whereby a molten wave of said material is caused to be moved through each zone and successively through the plurality of said zones opposite to the direction of the cyclic movement thereof, with said resulting molten wave effect in turn providing a concentration of impurities in each zone at the downstream portion thereof, causing a final indirect heating stage for each zone, and in two stage manner of withdrawal, effecting a separate withdrawal of a molten stream of material containing impurities and a separate withdrawal of a substantially pure stream of material.

Depending upon the location of outlet means from each zone, or upon the sequence of opening valves in outlet means at each end of each zone, there can be a first withdrawal of molten impure material or, optionally, a first withdrawal of a molten stream of substantially pure material.

It is not intended to limit the present improved system to purifying any one type of low melting solid material, however, it may be of particular advantage, as noted hereinbefore, to effect the purification of a phenol, catechol, hydroquinone, and the like. In the preparation of phenol from the hydrolysis of a cumene hydroperoxide, there are minor amounts of mesityl oxide, phorone and methylbenzofuran so that it is desirable to effect the removal of such materials in order to obtain a substantially purified phenol product stream. Phenol has a melting point of the order of 160° F., catechol a melting point of about 220° F. and hydroquinone a melting point of the order of 347° F. all of which are within a suitable range of say from about 100° to 500° F. where the present system may well be used to advantage with readily available construction materials. Naphthalene with a melting point of about 176° F. and pyrogallol, with a melting point of about 270° F. are other low melting solid materials which might well be purified through the use of the present system.

In a more specific embodiment for a continuous cyclic system, there may be provided an annular shaped or doughnut shaped housing, which is segmented to provide a series of separate sections and means for rotating the entire unit through 360°. Thus, by the proper location of suitable heating and cooling means adjacent thereto, there may, in turn, be provided an alternating heating and cooling of the low melting solid material within each of the zones whereby there is caused the desired molten wave effect through each of the series of zones and a resulting purification of the desired low melting point solid.

Reference to the accompanying drawing and the following description thereof will serve to more clearly set forth in a diagrammatic manner the present method for purifying a low melting point solid material to obtain the advantageous features of a continuous process, as compared with

DESCRIPTION OF THE DRAWING

FIG. 1 of the drawing is a diagrammatic elevational view showing one embodiment of the improved continuous means for effecting the purification of the low melting point of solid material.

FIG. 2 of the drawing is a partial elevational view of an arrangement similar to FIG. 1 except that the outlet means from each zone is at the upstream end such that the resulting substantially pure stream may be withdrawn first.

FIG. 3 of the drawing is a partial elevational view diagrammatically indicating a somewhat modified form of continuous cyclic system for effecting the purification of a low melting point solid material.

Referring now particularly to FIG. 1 of the drawing there is shown an annular-shaped housing 1 which is adapted to continuously move through 360° of rotation around a suitable shaft or axial means 20. The housing 1 has spaced partitioning means 21 which in turn divide the interior thereof into a plurality of separate purification zones, indicated in the present embodiment to be I, II, III and IV. A molten feed stream, which is to be purified, is introduced through a central inlet line 2 into an annular distributor zone around the shaft 20 so as to in turn feed a molten stream outwardly through separate delivery lines 3, 4, 5 and 6. The latter are, in turn, provided respectively with automatically operating valves 7, 8, 9 and 10. In order that there be a continuous sequential operation of the system, the valves 7, 8, 9 and 10 are preferably of an automatic type, such as magnetic type valves permitting a sequential operation to effect the timed filling of each of the separate zones I, II, III and IV with the unpurified molten stream.

Positioned externally, but in indirect heat exchange relationship with the annular shaped housing 1, there are a plurality of heaters 15 which are spaced one from another in a manner to permit cooling to take place for the intervals therebetween. Also at the discharge or withdrawal zone of the system, there are more elongated heating zones 16 and 18 that are positioned above collection trough areas 17 and 19. Suitable discharge valves 11, 12, 13 and 14 are also provided, respectively, for each of the solids purifying zones I, II, III and IV. Again, such valves are preferably electrically operated, or otherwise of an automatic type of operation, such that there is suitable instrumentation to effect the automatic and sequential opening of each valve as each of the respective purification sections reaches a discharge portion of the system.

In a typical operation, there is a sequential filling at each of the segmented zones, as for example, zone I is filled by way of the inlet line 4 and control valve 8 with the impure solid stream being in a molten state prior to reaching lines 2 and 4. The housing 1 is of course maintained in continuous rotation, even during the filling operations. Thus, as the filled zone I reaches the first heating element 15 after a first cooling and at least partial solidification of the internally held material, there is a reheating of such internally held material. As the annulus continues its rotation each of the spaced heaters 15 and alternately spaced cooling areas initiates a new moving "molten wave effect" which in turn moves internally within each of the purification zones, against the overall movement of the latter. Where the annulus is moving clockwise as shown in the drawing, then the molten wave moves, in effect, counter-clockwise to concentrate all of the impurities in the "back" or counter-clockwise ends of each of the segments. The entire unitary system may be within a cooled zone such that there is the desired cooling between each of the spaced apart heating elements 15 to insure that each melting wave is followed by a cooling wave and then another melting wave, etc. Thus, within each segment, during the movement of the sequentially spaced segmental zones I through IV, there is the desired gradual movement of the impurities into the downstream end of each unit with respect to the clockwise movement of the annular-shaped housing.

In an alternative system, where additional cooling may be required with respect to the spacings between heating zones 15, then there may be supplemental cooling as, for example, from a plurality of cooled air streams 22 issuing from cooler means 23. The latter is indicated diagrammatically as having a cooling coil 24 and fan means 25 to provide for the desired low temperaure air stream to be divided through suitable outlets or duct means and carry to the external surface of the housing 1 between spaced heaters 15.

After a plurality of heating and cooling waves are provided in each zone, such that the impurities in the molten solid material are substantially concentrated within the rear portion of each zone as they move sequentially in a clockwise manner to the lower discharge area, there is an opening of outlet valve means, such as valve 11 for zone I as the latter passes over the collection trough 17. Each of the discharge valves for each purification segment is in the rear portions of each such segment. Thus, there is a resulting first discharge of the impure solids material from the zone into the collection trough 17 and a resulting discharge by way of outlet means 26. Subsequently, as the segmented housing 1 moves farther along to be over the collection zone 19, there is a discharge of the remaining molten and substantially purified material into a separate collection trough 19. This desired substantially purified solids material may be withdrawn from the system by way of outlet 27. In each instance, the elongated heating zones 16 and 18 insure that there is a molten state for the solid material as it is being discharged from each segmental zone passing over the discharge area.

After each purification zone, as for example section I, has passed beyond the collection trough 19 and heating zone 18, there is an automatic closing of the accompanying outlet valve 11 so that the segment is again ready for filling by way of the inlet line 4 and the automatically opening valve 8. There is the continuous repetitious complete cyclic operation for each of the plurality of separate segmental zones, with each such zone being subjected to the filling, heating, cooling, reheating, recooling etc., until such time that there is a desired concentration of the impure materials in the rear portion of each of the zones and a stage-wise discharge of molten materials from each zone. The impure material is withdrawn firstly from the outlet valve means located at the rear portion of each zone into the collection trough 17 and then, secondly, an emptying of each zone to provide a remaining substantially pure portion of the material into the trough 19. Each operation is carried out sequentially for each of the separate successive series of zones in the housing 1 and there is a resulting continuous operation thus made possible.

It is to be pointed out that the apparatus arrangement of FIG. 1 is merely diagrammatic and but one embodiment for carrying out the desired continuous zone-melting purification system, whereby molten wave effect is accomplished in a continuous manner on a series of zones so as in turn to effect means for concentrating impurities and obtaining the discharge of the desired purified stream in an economical manner. Also, in order to simplify the drawing, there has been no showing of a control panel nor of the wiring and timing means to be associated with the continuous system. However, a preferred embodimnt uses suitable timing means for the rotation of the housing and for sequentially timing all of the valving such that there is the proper sequential filling and emptying of each zone.

In FIG. 2 there is shown a modified arrangement of the system for separation in that the molten substantially pure stream of material is withdrawn firstly and the impure material withdrawn secondly. In this instance by way of example, a valved discharge means 13' is located at an upstream end of zone III' such that after the molten wave separation effect therein, there can be a first stage withdrawal of the substantially pure material located in the forward portion of the separation zone. With the first stage of withdrawal effected over trough 17', there will be, in this case, a collection of pure material therein and its discharge from outlet 26'. Subsequently, in a second stage of withdrawal, the remaining molten stream of material containing impurities will be discharged into trough means 19' and discharged from the system by way of outlet 27'.

After the two stage sequential withdrawal of molten material the valve means 13' will be closed and there will be a subsequent refilling of zone III' by way of line 6' and inlet valve means 10'. Each of the other zones of the annulus system will, for this modification, be emptied in the same manner as described for III'.

In FIG. 3 of the drawing there is indicated still another modified embodiment that provides for a series of segmental purification zones in an arrangement other than in an annulus or circular form. It is, however, desired that there be a continuous cyclic system so that there may be continuous purification of the solids material without interruption. In this instance there are shown a series of separate purification chambers 30 moving along on guides or suitable roller means 31 so as to effect a continuous cyclic path. Each zone 30 is provided with suitable inlet means 32 as well as suitable automatically operating valved outlet means 33. In a manner similar to that carried out with the embodiment of FIG. 1, there will be the sequential filling and emptying of each of the separate purification zones 30 as each of the latter moves from a filling position into the discharge area. In this instance, there are a plurality of spaced heater means 34 so as to provide suitable cooling spaces 35 therebetween and in turn effect the desired molten wave of solids materials within each of the zones and a gradual movement and concentration of impurities to a rear portion of each zone as they move in a cyclic system. At the discharge area of the system, there is again provided suitable elongated heater means 36 and collection trough means 37 whereby there may be a first stage of withdrawal of the impure molten solids material as the discharge valves 33 are opened upon the reaching the lower discharge area. Subsequently, after there is effected the withdrawal of the impure portion of the molten solids, there is a continuous discharge and removal of a substantially pure portion of the solids material in the trough means 38. The heater means 39 is positioned in the secondary discharge area above collection trough 38 so as to insure the molten stage for the solids material being emptied from each purification zone 30. A desired embodiment of this system of course provides for electrically or other automatically operating types of valving and automatic timing of such valves such that there is a sequential filling of each purification zone 30 through inlet means 32, as well as the timed sequential opening of each of the series of outlet valves 33 to provide for the two stage withdrawal of molten solids from each zone 30. Although not shown in the embodiment of FIG. 3, there may be suitable externally provided cooling means to insure solidification of solids within each of the series of purification zones 30 for the intervals between heating coils 34 and within the areas 35, whereby to insure the desired wave effect within each zone.

While the present drawing and the foregoing description is limited to diagrammatically showing two embodiments for carrying out the desired cyclic system, it will be obvious that other related and modified types of systems may be mechanically worked out to provide the improved purification procedure. In all cases there will be the alternative cooling and heating stages on moving zones such that there is the desired molten wave effect moving opposite to the direction of movement of the segmental purification zones and a resulting concentration of impurities at the rear portion of each of the zones. Also, various arrangements may be provided for effecting the stage-wise withdrawal of molten solids from each of the zones so that there is a separate collection of impure materials and of substantially purified solid materials.

I claim as my invention:

1. A continuous method for purifying low melting solid materials, which comprises, (a) heating the material to be purified into a molten state and (b) distributing it sequentially to a plurality of separate elongated zones being successively positioned in a movable series thereof, (c) effecting a continuous movement of said series of separate zones within a cyclic system and, following the filling of molten material into each zone, then for each such zone in a sequential manner:
    (1) effecting indirect cooling of said zone and a resulting solidification of the material to be purified therein,
    (2) effecting indirect heating sufficient to cause partial melting of such solidified material in such zone,
    (3) further effecting at least one additional cooling step, whereby a molten wave of said material is caused to be moved through each zone and successively through the plurality of said zones opposite to the direction of the cyclic movement of said zones, with said resulting molten wave effect in turn providing a concentration of impurities in each zone at the downstream portion with respect to the wave movement,
    (4) causing a final indirect heating stage for each zone, and
    (5) in two stages of withdrawal, separately and sequentially withdrawing a molten stream of material from each of said plurality of said zones containing impurities and a separate stream of substantially pure material.

2. The method of claim 1 further characterized in that in the two stages of withdrawal a molten stream of material containing impurities is firstly withdrawn from the downstream end of each zone and then secondly a remaining stream of substantially pure material is withdrawn.

3. The method of claim 1 further characterized in that in the two stages of withdrawal a molten stream of substantially pure material is firstly withdrawn from the upstream end of each zone and then secondly a remaining molten stream of material containing impurities is withdrawn.

4. The method of claim 1 further characterized in that the indirect heating for each zone is adjustably controlled electrical resistance heating.

5. The method of claim 1 further characterized in that the indirect cooling for each of said zones is a cooled air stream directed to impinge over the path of each zone between heating stages.

6. A continuous method for purifying low melting solid materials, which comprises, (a) heating the material to be purified into a molten state and (b) distributing it sequentially to a plurality of separate zones being successively positioned in a circular manner, (c) effecting a continuous rotation of said zones through 360° and for each 360° of rotation for each zone,
    (1) effecting indirect cooling of said zone and a resulting solidification of the material therein,
    (2) effecting indirect heating sufficient to cause partial melting of the solidified material therein,
    (3) further effecting at least one additional cooling step and at least one additional heating and melting step, whereby a molten wave of said material is caused to be moved through each zone and successively through the plurality of said zones against the direction of rotation thereof, with said resulting molten wave effect in turn providing a concentration of impurities in each zone at the downstream end portion with respect to the wave movement, (4) causing a fine indirect heat stage for each zone, and (5) in two stages of withdrawal separately and sequentially withdrawing a molten stream of material from each of said zones containing impurities and a molten stream of substantially pure material.

7. The method of claim 6 further characterized in that in the two stages of withdrawal a molten stream of material containing impurities is firstly withdrawn from the downstream end of each zone and then secondly a remaining stream of substantially pure material is withdrawn.

8. The method of claim 6 further characterized in that in the two stages of withdrawal a molten stream of substantially pure material is firstly withdrawn from the upstream end of each zone and then secondly a remaining molten stream of material containing impurities is withdrawn.

References Cited

UNITED STATES PATENTS

| | | | |
|---|---|---|---|
| 2,809,884 | 10/1947 | Ratje | 260—621 |
| 2,861,112 | 11/1958 | Christensen | 260—621 |
| 2,904,412 | 9/1959 | McBriede et al. | 260—707X |
| 2,952,722 | 9/1960 | Jackson | 75—10ZMX |
| 3,400,548 | 9/1968 | Drayer | 260—707X |

LEON ZITVER, Primary Examiner

N. P. MORGENSTERN, Assistant Examiner

U.S. Cl. X.R.

260—704; 23—273SP, 275, 299; 23—308R; 75—65ZM, 65 electron beam D, 10R; 148—1.5, 1.6